E. B. HOUSE.
FUNNEL STRAINER.
APPLICATION FILED AUG. 27, 1917.
1,286,639.
Patented Dec. 3, 1918.
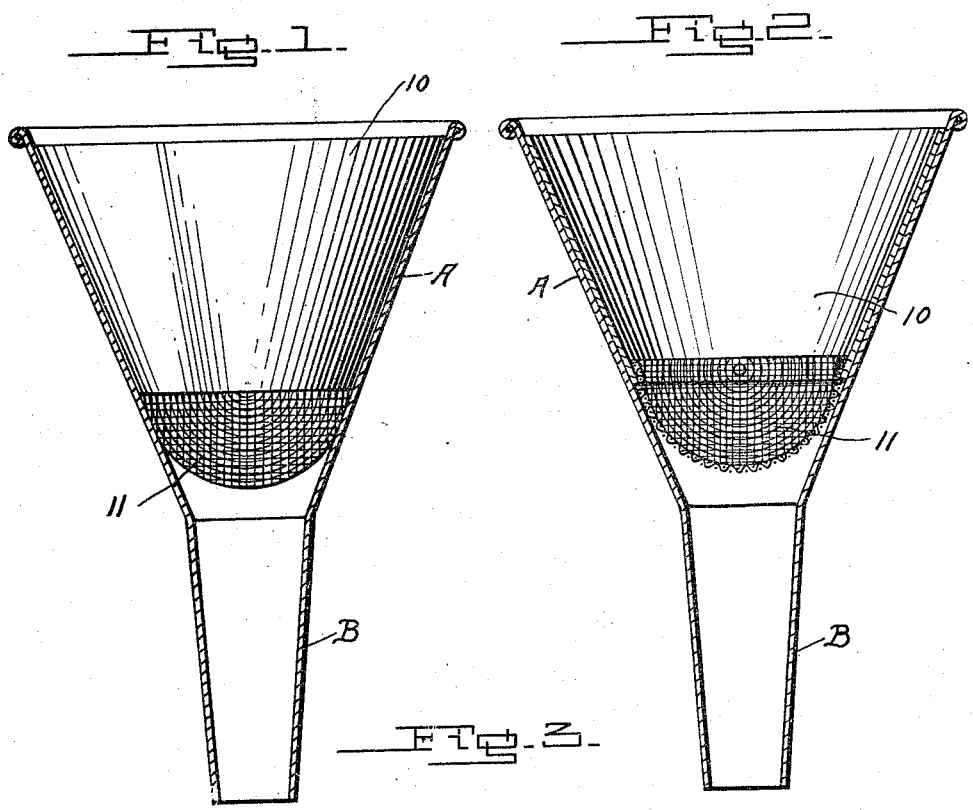
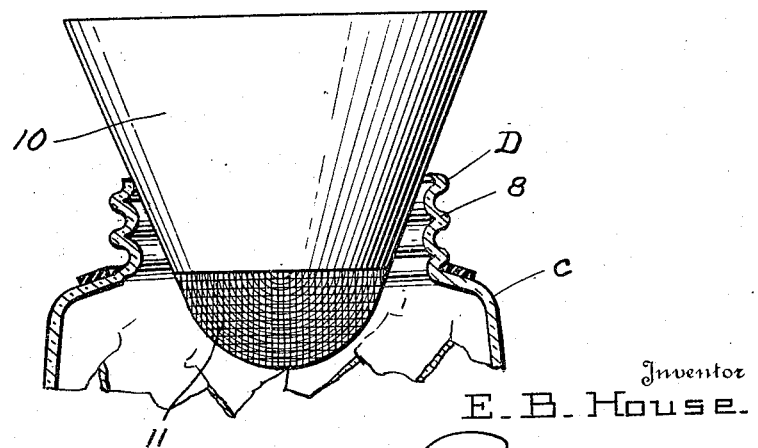
Inventor
E. B. House.

UNITED STATES PATENT OFFICE.

ELENA B. HOUSE, OF HOOD, CALIFORNIA.

FUNNEL-STRAINER.

1,286,639.  Specification of Letters Patent.  Patented Dec. 3, 1918.

Application filed August 27, 1917. Serial No. 188,391.

*To all whom it may concern:*

Be it known that I, ELENA B. HOUSE, a citizen of the United States, residing at Hood, in the county of Sacramento and State of California, have invented new and useful Improvements in Funnel-Strainers, of which the following is a specification.

The present invention relates to kitchen and like utensils, and has more particular reference to funnels and strainers.

An object of the present invention is to provide a device combining a funnel and a strainer, and which may be used by itself as a funnel and strainer, or which may be applied to funnels of ordinary construction for straining material passing through the same.

The invention further aims at a provision of a relatively simply constructed device which is economical to manufacture, which comprises relatively few parts, and which may be readily cleansed and used.

The above, and various other objects and advantages of this invention will be in part described, and in part understood, from the following detailed description of the present preferred embodiment, the same being illustrated in the accompanying drawing wherein—

Figure 1 is a longitudinal section through a funnel of ordinary form showing the funnel strainer of this invention applied thereto, the latter being in side elevation.

Fig. 2 is longitudinal section through both the funnel and the funnel-strainer.

Fig. 3 is a side elevation of the funnel-strainer of this invention as applied to a fruit jar or the like.

Referring to this drawing, A designates the body of a funnel of ordinary construction having the tapering neck B adapted to fit in bottle necks, can openings and the like, small apertures for directing liquid poured into the top of the funnel into a container.

The device of this invention comprises a supporting body part of frusto-conical form as shown at 10, the latter being shaped to the configuration of a funnel and adapted to fit therein when it is desired to strain fluid, or the like, passing downwardly through the funnel A. The lower end of the body part 10 is provided with a bottom portion of substantially semi-spherical form as indicated at 11, such portion 11 constituting the strainer part of the device and being formed of wire meshing of the desired gage and mesh, and which is preferably of about one inch in depth. The upper marginal edge portion of the strainer part 11 is preferably secured by solder or any other suitable means to the inner side of the funnel part 10 and at the lower marginal edge thereof. The fluid or the like poured into the body part 10 passes downwardly therethrough into the contracted end of the body part and outwardly through the strainer 11.

As shown in Fig. 3, this funnel strainer is adapted to be used alone when applied to containers C having relatively large openings or necks D capable of receiving the lower contracted end portion of the body 10.

The device thus constructed may be readily inserted into funnels of practically any size as the conical supporting body part 10 simulates the body portion of the funnel and telescopically fits therein at any desired height, according to the size of the funnel. It is readily understood that the body need not have its side walls inclined or tapered at the same angle as that of the funnel A as the larger part of the body or support 10 will move downwardly in the funnel A until the enlarged end of the body 10 binds in the contracted end of the funnel. The strainer part 11 will therefore be held at the lower end of the funnel A irrespective of the size and slope of the same.

It is of course understood that the funnel strainer of this invention may be used in various other ways than as above pointed out and shown in the accompanying drawing, and that various changes and modifications may be made in the structure and design of the same for adapting it to various uses, and for the purpose of ornamentation, the changes and modifications being restricted only by the scope of the following claim.

What is claimed is:

A funnel strainer comprising a frusto-conical body and a semi-spherical foraminous section, the edge of said semi-spherical section bent inwardly, engaging and attached to the inner surface of the body at the small end of the same whereby the portion of the substantially semi-spherical section in juxtaposition to said body forms a continuation of the side of the body to permit the funnel strainer to be placed within an ordinary funnel.

ELENA B. HOUSE.

Copies of this patent may be obtained for five cents each, by addressing the "Commissioner of Patents, Washington, D. C."